G. G. PORTER.
STEERING MECHANISM FOR MOTOR VEHICLES.
APPLICATION FILED DEC. 30, 1905.
904,225.
Patented Nov. 17, 1908.
2 SHEETS—SHEET 2.
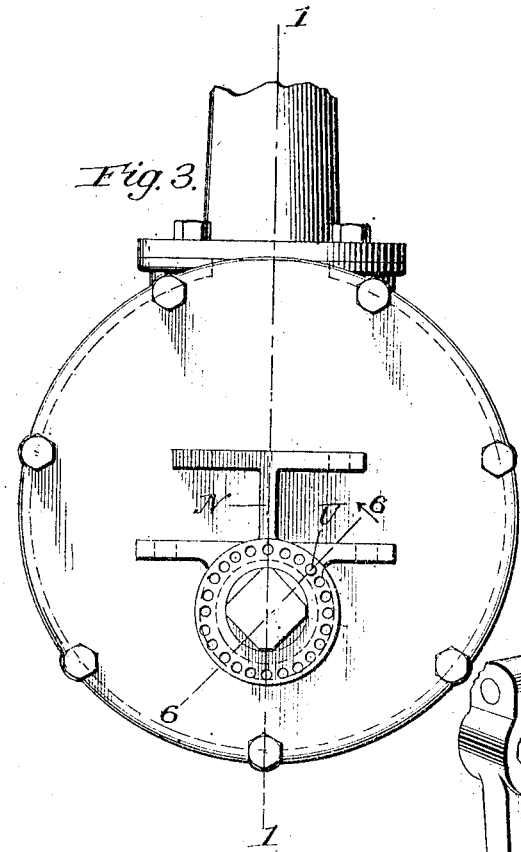
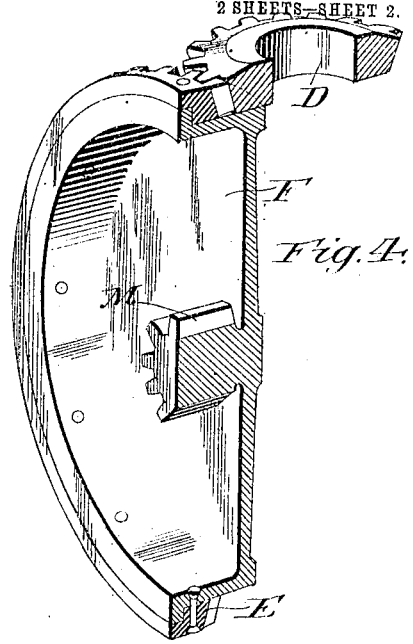
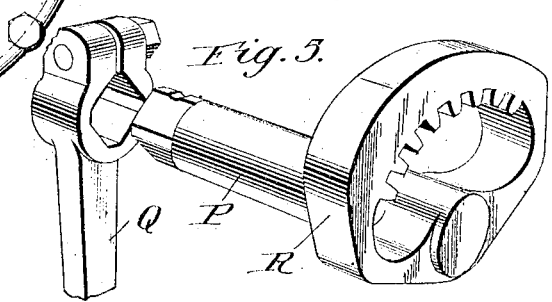
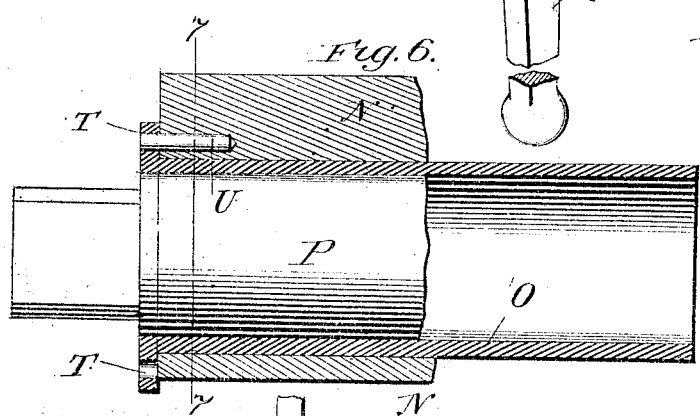
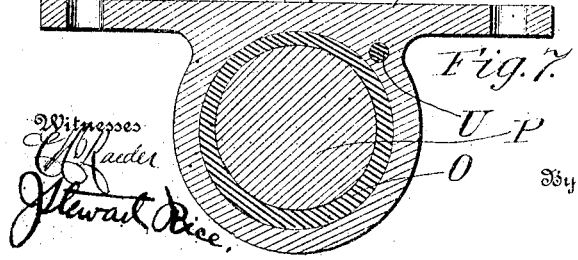
Witnesses
Inventor
George G. Porter,
By Dodge and Sons
Attorneys

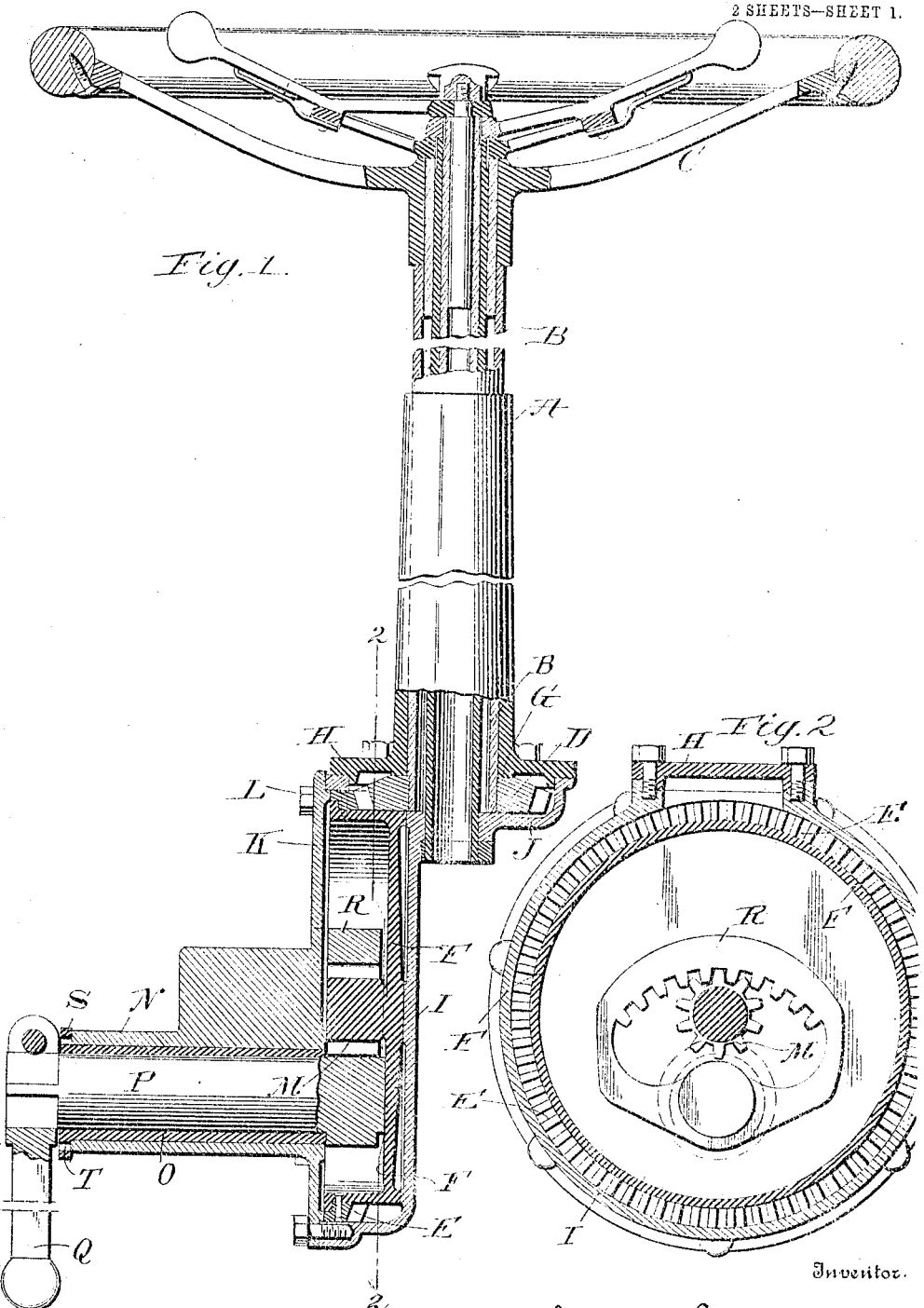

UNITED STATES PATENT OFFICE.

GEORGE G. PORTER, OF SYRACUSE, NEW YORK, ASSIGNOR TO BROWN-LIPE GEAR COMPANY, OF SYRACUSE, NEW YORK, A CORPORATION OF NEW YORK.

STEERING MECHANISM FOR MOTOR-VEHICLES.

No. 904,225.     Specification of Letters Patent.     Patented Nov. 17, 1908.

Application filed December 30, 1905. Serial No. 293,968.

*To all whom it may concern:*

Be it known that I, GEORGE G. PORTER, a citizen of the United States, residing at Syracuse, in the county of Onondaga and State of New York, have invented certain new and useful Improvements in Steering Mechanism for Motor-Vehicles and the Like, of which the following is a specification.

My present invention pertains to improvements in steering mechanism for motor vehicles and the like, the construction and advantages of which will be hereinafter set forth, reference being had to the annexed drawings, wherein:

Figure 1 is a longitudinal sectional view in elevation of the mechanism, taken partly in elevation of the mechanism, taken on the line 1—1 of Fig. 3; Fig. 2 a vertical sectional view, taken on the line 2—2 of Fig. 1; Fig. 3 a face elevation of a portion of the mechanism; Fig. 4 a sectional perspective view of the movable braking member, together with a part of the means for moving the same; Fig. 5 a perspective view of the rocker-shaft, its attached segmental gear or rack and the steering member; Fig. 6 a longitudinal sectional view, taken on the line 6—6 of Fig. 3; and Fig. 7 a transverse sectional view, taken on the line 7—7 of Fig. 6.

The main object of my invention is to provide a steering mechanism, which is simple in construction and highly efficient and durable in use.

Another object is to provide an automatic brake for reducing to a minimum the movement of the steering-post by the steering mechanism when force is applied thereto through the wheels of the vehicle, as for instance when the wheels come in contact with an obstruction or the like.

A still further object of the invention is to provide a construction wherein gearing may be employed to impart motion to the parts and, further, to provide means for keeping the gears in proper adjustment and thus preventing, to a greater or less extent, any back-lash which would otherwise obtain.

With these and other objects in view, I will now give a detailed description of the preferred form of my invention.

Referring to the drawings, A denotes the usual column or standard, in which is journaled a steering-post B, carrying at its upper end a steering-wheel C. To the lower end of the steering-post is secured a gear D, which gear in turn meshes with a gear E fixed relatively to the braking member F, and preferably provided at, or adjacent to, the periphery of such member.

In the illustrated embodiment of this invention, the upper face of the gear D bears against a shoulder or projection G, formed at the lower portion of the column A, said column being likewise provided with a foot-piece or flange H which overlies the gear. I do not, however, limit this invention to a column or standard provided with the shoulder G and the foot-piece or flange H.

The movable braking member F coacts with a fixed braking member I, and is preferably seated within said member I, the member F being formed with a peripheral annular combined bearing and braking surface, and the member I being provided with an internal annular combined bearing and braking surface, the internal diameter of which is slightly in excess of the diameter of said peripheral bearing and braking surface of the member F.

In the illustrated embodiment of my steering mechanism, the member I is provided with a laterally-extending portion J, said portion being secured to the foot-piece H and forming a part of the casing for the gear D; and the member F is maintained in position within the shell or fixed member I by a combined cover and supporting plate K, which, as will be seen upon reference to Figs. 1, 2 and 3, is directly attached to said shell or member I by suitable tap-bolts L. I do not, however, restrict this invention to the described means for incasing the gear D and the braking member F. The braking member F preferably serves to transmit motion to the steering member, and to this end is formed cup-shaped and is provided with a pinion M extending from the bottom of the cup-shaped cavity of the member F and arranged concentrically with reference to the gear E and its braking and bearing face. In the form shown the pinion is made integral with the member F though, of course, it will be appreciated that the two may be made separately and secured together in any approved manner.

In the illustrated embodiment of my invention, an eccentric bushing or bearing member O is mounted within an opening formed in an extension N of the supporting plate K, and a rocker-shaft or arm P is journaled in said bushing and is suitably fixed at its outer end to a steering member Q, which, as will be readily appreciated by those skilled in the art, is designed to be coupled to the steering gear of the vehicle. The shaft P carries at its inner end a segmental gear or rack R which, as best shown in Fig. 5, will preferably be formed as an integral portion of said shaft. When the parts are assembled, this rack or segmental gear meshes with the pinion M, so that any movement of the pinion, caused by rotation of the member or shell F, will be imparted to the rack and consequently to the steering member Q, through shaft P.

The bushing O is provided with a collar S at its outer end, said collar being formed with a series of openings T, through which a pin U may be driven when any one of said holes stands in alinement with an opening or hole formed in the member N. By shifting the bushing the rack or segmental gear R may be brought into proper mesh with the pinion M, and as the parts become worn this adjustment may from time to time be made in order to take up any back-lash or wear.

The hollow casing composed of the foot-piece H, the shell or brake member I and its laterally-extending portion J, and the cover plate K, comprises portions disposed at an angle to each other, one encircling the lower end of the steering-post and the gear D, and the other depending from one side of the first-mentioned portion of the casing, at one side of, and parallel with, the longitudinal axis of the steering-post and serving to incase the braking member F, the gear E, the pinion M, and the rack R.

The operation of the mechanism is as follows: Power applied through handle C and post B to the gear D will tend to rotate the member F, and inasmuch as the power is applied to the member F substantially tangentially thereof and at a point remote from its center or axis, said member will turn in its bearing in the fixed member I with but little friction between the bearing surfaces. Rotation of member F will, consequently, rotate the pinion M and impart motion to the rack R and a corresponding motion to the shaft P and attached steering member Q. The parts may freely move in either direction so long as the power or force is applied through the handle C, or to the periphery of the shell or member F. Said shell or member F, however, acts as an automatic brake when subjected to force through the steering member Q, shaft P, rack R and pinion M since the segmental gear or rack R applies its driving force to the braking member F substantially radially of said member at a point near the center thereof. Consequently a slight pressure applied to the member Q will cause a sidewise movement of the member F, which movement, however, is extremely small, thereby bringing the braking faces of the member F and the fixed member I into contact, and precluding rotation of the member F and consequently rotation of the gear D. Thus I reduce to a minimum the liability of the transmission to the steering-post and its attached handle or wheel of any jar or force applied to the wheel of the vehicle and through it to the steering member Q. It is immaterial in which direction the force is applied to the member Q, as the member F will be moved to one or the other side of its center into direct contact with the braking face of the fixed member I. It is necessary, of course, that the member F be of a diameter sufficiently large to effect the braking action. If the diameter of said member be too small, no braking action will be obtained. The proportions shown in the annexed drawings have in actual practice given efficient results. It is to be understood, however, that the invention is not limited to the proportions illustrated. It is also clear that the gear E may be formed as an integral portion of the member F, but as this falls more within the province of the mechanician it is not deemed necessary to illustrate the same herein. It is also evident that the member F may be provided with a braking surface independent of the gear E. In other words, the invention in its broad aspect is not to be limited to the details of construction herein shown. It is likewise evident that the braking member may be formed independent of the transmission gear and thus serve as a braking member only, and not as a combined actuating and braking member, it being only necessary to have the power or force which is transmitted from the steering member applied to one side of the center of the braking surface to cause it to function. It is also evident that other suitable means may be utilized for transmitting motion to the braking member F from the steering-post, and to the steering member Q from the pinion M fixed relatively to, and movable with, the braking member F. Moreover, although as here illustrated the braking member F, the gear E, the pinion M, and the rack R rotate or rock about axes arranged at substantially a right angle to the longitudinal axis of the steering-post, I do not limit my invention to such arrangements of these parts.

Having thus described my invention, what I claim is:

1. In a steering mechanism a fixed annular bearing, a rotary friction-disk having its periphery engaging said bearing, a steering-post operatively connected to said disk for actuating the same, a pinion rotated by the steering-post and a rock-arm actuated by the pinion.

2. In a steering mechanism, the combination with a rack and pinion intermeshing with each other, of a friction-disk secured to one of the aforesaid parts, a fixed bearing for the friction-disk and a steering-post connected to and actuating the pinion and disk said steering-post being arranged at an angle to the axis of the friction-disk.

3. In a steering mechanism a fixed bearing having an annular friction-face, a rotary disk having its periphery engaging said face, a pinion, a steering-post for rotating said pinion and disk, and a lever having a toothed rack engaged with the pinion.

4. In combination with a steering-post; a steering member; transmission means between said post and member, including a part movable about an axis and arranged with said axis at an angle to the steering-post; and an automatic brake actuated by force applied to the steering member, whereby the rotation of the steering-post by the steering member is minimized, the brake including engaging surfaces concentric with said part of the transmission means and formed of greater diameter than such part, one of the engaging surfaces being fixed relatively to said part of the transmission means.

5. In combination with a steering-post; a steering member; a rack-and-pinion drive interposed between said post and member the pinion being arranged with its axis at an angle to the steering-post; and an automatic brake actuated directly by force applied to said rack and pinion from the steering member whereby the rotation of the steering-post by the steering member is minimized, the brake including circular engaging surfaces concentric with the pinion of the rack-and-pinion drive and formed of greater diameter than such pinion, one of the engaging surfaces being fixed relatively to said pinion.

6. In combination with a steering-post; a steering member; a rack-and-pinion drive interposed between said post and member, the pinion being spaced apart from, and connected to, the steering-post, and the steering member being free to be moved in either direction by the steering-post; and an automatic brake interposed between the pinion and the steering-post and actuated directly by force applied to the steering member, whereby the rotation of the steering-post by the steering member is minimized.

7. In combination with a steering-post; a steering member; transmission means between said post and member, including a pinion movable about an axis and arranged with said axis at an angle to the steering-post; and an automatic brake actuated by force applied to the steering member, whereby the rotation of the steering-post by the steering member is minimized, the brake including a fixed member having an engaging surface, and a rotary member fixed relatively to the pinion and having an engaging surface coacting with the first-mentioned surface, said engaging surfaces being concentric with the pinion and of greater diameter than said pinion.

8. In combination with a steering-post; a steering member; a rack connected to and movable with the steering member; a combined gear and braking member; a pinion arranged concentrically of said braking member and meshing with the rack; a fixed braking member; and a driving connection interposed between the steering-post and the combined gear and braking-member, whereby said post and member rotate at different speeds.

9. In combination with a fixed member provided with an annular braking surface; a steering member; a rocker-shaft or arm for said steering member; a rack or segmental gear carried by the shaft, said gear standing eccentric to the braking surface; an actuating disk or member provided with an annular braking surface arranged to bear upon the braking surface of the fixed member; a pinion carried by said disk at its center and meshing with the rack; a steering-post; and driving connections interposed between said post and disk.

10. In combination with a steering-post; a steering member; a fixed annular braking surface; a movable annular braking member; an eccentric connection between the steering member and the movable braking member; and a driving connection between the movable braking member and the post, the point of connection being remote from the center of the braking member.

11. In combination with a steering-post; a gear carried thereby; a second gear meshing therewith; a pinion carried by and rotatable with said second gear; an annular braking surface carried by said second gear; a fixed braking surface arranged to coact with said annular braking surface; a rack meshing with the pinion; and a lever connected to the rack.

12. In combination with a fixed annular braking surface; a rotatable disk provided with a complemental braking surface; a pinion located centrally of said disk; a rack meshing with the pinion; a member connected to said rack and movable therewith; and means for applying power to the disk at or adjacent to its periphery.

13. In combination with a steering-post; a steering member; a rack carried by and movable with said steering member; a pinion meshing with the rack; a combined braking and actuating member, said member carrying the pinion at its center; a fixed braking surface; and means interposed between the steering-post and the combined braking and actuating member for moving the same and thereby actuating the steering member.

14. In combination with a steering-post;

a steering member; transmission means between said post and member, including a part movable about an axis and arranged with said axis at an angle to the steering-post; a fixed member having an internal surface; and a member fixed relatively to said part of the transmission means and being concentric with said part and formed of greater diameter than the same, the last-mentioned member having a peripheral surface coacting with the first-mentioned surface to form a journal-bearing for said part of the transmission means when the post serves to operate the steering member, and said last-mentioned member being movable to one side when force is applied to the steering member tending to rotate the post, and thereby causing said internal and peripheral surfaces to coact as an automatic brake to minimize the rotation of the post by the steering member.

15. In combination with a steering-post; a bevel-gear carried thereby; a fixed member provided with an internal annular braking surface; a disk having a combined bearing and braking surface; a gear connected to said disk adjacent to its periphery and meshing with the gear carried by the steering-post; a pinion mounted upon the disk at its center; a steering member; a rocker-shaft or arm for said steering member and to which said member is rigidly secured; and a rack or segmental gear carried by said rocker-shaft and meshing with the pinion, whereby any force applied to the steering member will throw the braking surface of the disk into contact with the braking surface of the fixed member and transmission of motion to the steering-post will be minimized.

16. In combination with a steering-post; a bevel-gear carried thereby; a fixed member provided with an internal annular face; a shell or disk having an external combined bearing and braking face arranged in juxtaposition to said bearing face of the fixed member; a gear carried by said shell or disk at its periphery and meshing with the gear carried by the steering-post; a pinion extending outwardly from the center of the disk; a shaft or arm mounted in a bearing formed in the fixed member; a steering member secured to one end of the shaft; and a segmental gear or rack carried by the opposite end of the shaft, said rack meshing with the pinion.

17. In combination with a steering-post; a steering member; a rack-and-pinion drive interposed between said post and member; an automatic brake actuated directly by force applied to said rack and pinion from the steering member; and adjustable means for maintaining the rack and pinion in proper adjustment.

18. In combination with a steering-post; a steering member; a rack-and-pinion drive interposed between said post and member, the steering member being free to be moved in either direction by the steering-post; an automatic brake interposed between the pinion and the steering-post and actuated directly by force applied to the steering member, whereby the rotation of the steering-post by the steering member is minimized; and adjustable means for maintaining proper adjustment of said rack and pinion.

19. In combination with a fixed member provided with an internal annular braking surface; a cup-shaped shell or member provided with an external bearing face; a steering-post; a gear carried by said post; a second gear carried by the cup-shaped member and meshing with the gear carried by the post; a pinion extending centrally from the bottom of said cup-shaped shell; a rocker-shaft; an adjustable eccentric bearing for said shaft; and a segmental rack or gear carried by the inner end of the shaft, said gear meshing with the upper portion of the pinion, substantially as and for the purpose described.

20. In combination with a relatively fixed member provided with an annular bearing and braking surface; a rotatable member mounted therein; a pinion carried by said rotatable member at its center and at a point remote from the periphery thereof; a rack meshing with the pinion; a steering member connected to and movable with the rack; and a steering device in operative connection with the rotatable member adjacent to its periphery, whereby when force is applied to the steering member the rotatable member will be thrown off center and into braking engagement with the fixed member.

21. A steering gear comprising a steering post, a standard in which the steering post is journaled, a casing fixed to the standard and having a portion thereof encircling the lower end of the steering post, and another portion thereof depending from one side of the first-mentioned portion of the casing, connected power-transmitting members within the casing, one being revoluble with the steering post and the other being revoluble about an axis disposed at an angle to the longitudinal axis of the steering post, a brake member within the casing revoluble with one of the power-transmitting members and formed of greater diameter than the same, and means fixed to the casing for coacting with the brake member, substantially as and for the purpose specified.

22. A steering gear comprising a steering post, a standard in which the steering post is journaled, a casing fixed to the standard and having a portion thereof encircling the lower end of the steering post, and another portion thereof depending from one side of the first-mentioned portion of the casing at one side of the longitudinal axis of the steering post, connected power-transmitting members within the casing, one being revoluble with the steering post and the other being revoluble about an axis disposed at an angle to said longitudinal axis, a brake member within the depending portion of the casing, said member being fixed to the power-transmitting member within such portion of the casing and formed of greater diameter than said power-transmitting member, and means fixed within the depending portion of the casing for coöperating with the brake member, substantially as and for the purpose described.

23. A steering gear comprising a hollow casing having portions thereof disposed at an angle to each other, a steering post revoluble in one of said portions of the casing, a pinion in said portion of the casing revoluble with the steering post, a toothed power-transmitting member arranged in the other portion of the casing and coöperating with the pinion, a steering arm movable by the toothed member, a brake member within the portion of the casing containing said toothed member, said brake member being fixed to said toothed member and formed of greater diameter than the same, and means fixed to the casing for coöperating with the brake member, substantially as and for the purpose set forth.

In testimony whereof I have signed my name to this specification in the presence of two subscribing witnesses.

GEORGE G. PORTER.

Witnesses:
HORACE A. DODGE,
CHARLES H. RAEDER.